April 30, 1957  A. H. RIDEOUT ET AL  2,790,196
CASTER DOLLIES FOR TOBACCO BASKETS AND THE LIKE
Filed April 7, 1955
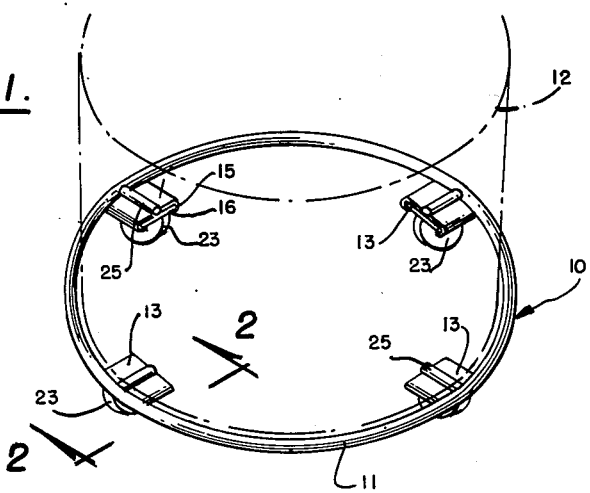
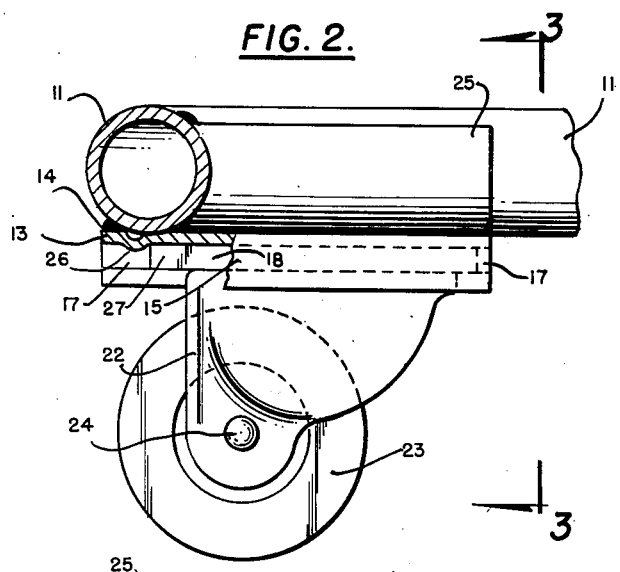
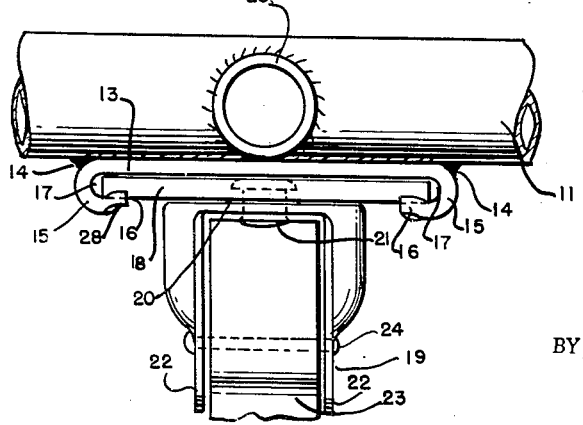
INVENTORS
AMOS H. RIDEOUT
WADE T. SURRATT
ATTORNEYS

2,790,196

CASTER DOLLIES FOR TOBACCO BASKETS AND THE LIKE

Amos H. Rideout and Wade T. Surratt, Winston-Salem, N. C.

Application April 7, 1955, Serial No. 499,884

1 Claim. (Cl. 16—30)

The present invention relates to dollies and, more particularly, to improved means for detachably connecting casters or rollers to dollies and the like.

An important object consists in associating with a tobacco warehouse dolly having a hollow or annular supporting base for carrying baskets and the like, spaced inwardly extending fixed plates or arms. Each of the fixed plates has its opposite sides formed wtih parallel transversely aligned slots facing each other for slidably receiving the top plate of a ground-engaging caster or the like. Additionally, means are provided for releasably securing the top plate of the caster in a fixed position when inserted into the slots.

A further object comprehends the provision of means for detachably connecting casters, rollers, or the like to a portable supporting structure, by means which dispenses with the use of bolts or pins and which provides a simple, efficient, and economical attachment for assembling or disassembling the casters from the dolly so that broken parts may be replaced at a minimum expediture of time, labor, and cost.

Other objects and advantages of the invention will become apparent from the following description when taken in conjunction with the accompanying claim and drawings.

Referring to the drawings in which is shown a preferred embodiment of the invention:

Figure 1 is a perspective view of a dolly constructed in accordance with the present invention;

Figure 2 is an enlarged sectional view taken substantially along the line 2—2 of Figure 1; and Figure 3 is a sectional view taken substantially along the line 3—3 of Figure 2.

Referring to the drawings, the portable supporting member or truck is shown in the form of a dolly 10 and includes a hollow base or frame 11 shown of ring shape and of such size as to conveniently support thereon a tobacco basket or the like 12. In order to facilitate the handling of the basket 12 when used in a warehouse for transporting tobacco from place to place, the hollow base supporting member 11 is provided with circumferentially spaced inwardly or radially extending fixed flat plates or arms 13, four of which are shown arranged in diametrically disposed pairs and connected in any suitable manner, such as by welding 14, to the bottom or inner side of the hollow base 11 (Fig. 3), so as to project therefrom inwardly a limited distance in order to constitute spaced supports on which the basket or receptacle 12 may be releasably positioned. Each of the fixed plates or members 13 has its opposed sides or marginal edges bent downwardly as at 15 (Fig. 3) and then inwardly to provide a lateral or horizontal bendable lip 16 and the transverse aligned slots 17 which face each other and are arranged to slidably receive the top plate 18 of the caster or roller assembly 19. A bearing plate or horn 20 of substantially inverted U shape is swiveled or rotatably connected to the top plate 18 by a king pin or bolt 21. A caster or roller 23 is positioned between the depending arms 22 of the plate 20 and is rotatably connected thereto by a transverse axle or pin 24.

Preferably, a reinforcing tubular member or bar 25 extends inwardly and radially from the ring 11 and is welded thereto and also to the top of the fixed plate 13 so as to reinforce the same. In order to limit the inward movement of the top plate 18 of the caster into the slots 17, the opposite sides of the plate 13 adjacent the lips 16 may be formed with depressions 26 (Fig. 2) that project downwardly into the slots 17 at the rear end thereof in order that the adjacent inner end 27 of the plate 18, will abut the projection 26 when inserted a predetermined distance within the slot. To releasably maintain the caster 19 in a fixed position when connected to the supporting base 11, the ends 16 of the fixed plate 13, after the top plate 18 is inserted in the slots 17, may be bent upwardly or pinched as as 28 by a suitable tool or hammer so as to force the ends of the lips into binding engagement with the adjacent surface of the caster plate 18. Conversely, when it is desired to withdraw the caster from the dolly, each indented lip 16 is pried open by a suitable tool such as a chisel or the like, so that the dolly may be withdrawn for replacement or repair. Each of the resilient tubular members 25 in addition to reinforcing the plate 13, is positioned directly over the king pin 21 of the caster so as to not only prevent thrust shock being transmitted to the king pin but also avoid uneven load pressure and strain being applied on the caster. Additionally, the bar 25 provides means for engaging the bottom or underside of the basket 12 to prevent the accidental sliding of the basket when positioned on the dolly.

Thus, it will be seen that simple, efficient, and economical means are provided for readily detachably connecting each caster to the dolly which eliminates the use of bolts and other separate fasteners, so as substantially to reduce the maintenance cost of operation. Moreover, the parts are constructed and arranged so as to allow the convenient and quick connection of each caster to the dolly, and also easy disconnection, so that any damaged or broken part is readily accessible for replacement or repair.

It will be understood that the form of the invention shown is merely illustrative and that such changes may be made as come within the scope of the following claim.

We claim:

A boltless caster mounting for dollies including a fixed plate connected to the underside of the dolly, said plate having opposite sides thereof bent downwardly and inwardly to provide lips and parallel elongated slots, said slots being in transverse alignment and facing each other, a top plate having spaced parallel sides slidably mounted in said slots, a depending inverted U-shaped caster support having an intermediate portion and depending sides, a king pin rotatably connecting the intermediate portion of the support to said plate about a vertical axis, a caster wheel rotatably connected to the sides of said support, said fixed plate having stop means extending into the path of said top plate for limiting the inward movement of the top plate when the latter is inserted a predetermined distance within the slots, each of the lips being bendable into locking engagement with a side of said top plate to maintain the latter in a fixed position within the slots, and a reinforcing bar overlapping the top plate and positioned directly above and in substantial vertical alignment with said king pin so as to prevent thrust shock being transmitted to the king pin and avoid uneven load pressure being applied to the caster.

References Cited in the file of this patent

UNITED STATES PATENTS

| | | |
|---|---|---|
| 781,427 | Hussey | Jan. 31, 1905 |
| 1,301,495 | Otte | Apr. 22, 1919 |
| 2,277,703 | Kennedy et al. | Mar. 31, 1942 |
| 2,361,592 | Bjork | Oct. 31, 1944 |
| 2,611,622 | Kernkamp | Sept. 23, 1952 |
| 2,711,906 | Rideout et al. | June 28, 1955 |

FOREIGN PATENTS

| | | |
|---|---|---|
| 20,994 of 1904 | Great Britain | Sept. 30, 1904 |
| 699,807 | Germany | Dec. 6, 1940 |